United States Patent
Mase et al.

(10) Patent No.: US 11,338,751 B2
(45) Date of Patent: May 24, 2022

(54) OCCUPANT PROTECTION DEVICE FOR VEHICLE AND OCCUPANT PROTECTION METHOD FOR VEHICLE

(71) Applicant: TOYOTA JIDOSHA KABUSHIKI KAISHA, Aichi-ken (JP)

(72) Inventors: Yusuke Mase, Nagoya (JP); Hisashi Hagiwara, Toyota (JP); Takashi Fujinami, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 82 days.

(21) Appl. No.: 15/876,636

(22) Filed: Jan. 22, 2018

(65) Prior Publication Data

US 2018/0208141 A1 Jul. 26, 2018

(30) Foreign Application Priority Data

Jan. 25, 2017 (JP) .............................. JP2017-011335

(51) Int. Cl.
| | |
|---|---|
| *B60R 21/0134* | (2006.01) |
| *B60R 21/0132* | (2006.01) |
| *B60R 21/0136* | (2006.01) |
| *B60R 21/231* | (2011.01) |
| *B60R 21/01* | (2006.01) |
| *B60R 21/00* | (2006.01) |

(52) U.S. Cl.
CPC ...... *B60R 21/0134* (2013.01); *B60R 21/0132* (2013.01); *B60R 21/0136* (2013.01); *B60R 21/23138* (2013.01); *B60R 2021/0006* (2013.01); *B60R 2021/01013* (2013.01); *B60R 2021/01231* (2013.01); *B60R 2021/01286* (2013.01); *B60R 2021/01322* (2013.01)

(58) Field of Classification Search
None
See application file for complete search history.

(56) References Cited

U.S. PATENT DOCUMENTS

| | | | |
|---|---|---|---|
| 8,924,089 B2 | 12/2014 | Kim et al. | |
| 9,421,929 B2 | 8/2016 | Yoon | |
| 9,663,052 B2* | 5/2017 | Rao | B60R 21/0134 |
| 2005/0107933 A1* | 5/2005 | Kuroda | B60R 21/0133 |
| | | | 701/45 |

(Continued)

FOREIGN PATENT DOCUMENTS

| | | |
|---|---|---|
| JP | 11-180249 A | 7/1999 |
| JP | 2003-095058 A | 4/2003 |

(Continued)

*Primary Examiner* — Kevin P Mahne
*Assistant Examiner* — Hongye Liang
(74) *Attorney, Agent, or Firm* — Hauptman Ham, LLP

(57) ABSTRACT

There is provided an occupant protection device for a vehicle, the occupant protection device including a side collision prediction device configured to predict a collision with a side of a host vehicle and output a prediction result including determination about whether or not the predicted collision is an inevitable collision, a physical quantity detection device configured to detect a physical quantity related to the collision with the side of the host vehicle and output a detection value of the physical quantity, an airbag device configured to expand to protect an occupant of the vehicle when the airbag device is operated, and an electronic control unit.

7 Claims, 13 Drawing Sheets

(56) References Cited

U.S. PATENT DOCUMENTS

| | | | |
|---|---|---|---|
| 2008/0243343 A1 | 10/2008 | Kumagai et al. | |
| 2009/0138160 A1 | 5/2009 | Iyoda | |
| 2010/0057289 A1* | 3/2010 | Hiraoka | B60R 21/0133 |
| | | | 701/29.1 |
| 2010/0213693 A1* | 8/2010 | Foo | B60R 21/0132 |
| | | | 280/735 |
| 2013/0320654 A1 | 12/2013 | Clark et al. | |
| 2016/0339860 A1* | 11/2016 | Shimazu | B60R 21/0134 |
| 2016/0368445 A1* | 12/2016 | Foltin | B60R 21/0134 |
| 2017/0088085 A1* | 3/2017 | Yoshikawa | B60R 21/205 |

FOREIGN PATENT DOCUMENTS

| | | |
|---|---|---|
| JP | 2007-210563 A | 8/2007 |
| JP | 2007-253720 A | 10/2007 |
| JP | 2010-030354 A | 2/2010 |
| JP | 2010-047258 A | 3/2010 |
| JP | 5104847 B2 | 12/2012 |
| JP | 2016-199138 A | 12/2016 |
| JP | 2017-200791 A | 11/2017 |
| KR | 10-2004-0023723 A | 3/2004 |
| KR | 10-2013-0068771 A | 6/2013 |
| WO | 03/013911 A1 | 2/2003 |
| WO | 2007/119285 A2 | 10/2007 |
| WO | 2015/141864 A1 | 9/2015 |

* cited by examiner

OCCUPANT PROTECTION DEVICE FOR VEHICLE AND OCCUPANT PROTECTION METHOD FOR VEHICLE

INCORPORATION BY REFERENCE

The disclosure of Japanese Patent Application No. 2017-011335 filed on Jan. 25, 2017 including the specification, drawings and abstract is incorporated herein by reference in its entirety.

BACKGROUND

1. Technical Field

The present disclosure relates to an occupant protection device for a vehicle and an occupant protection method for a vehicle that protect an occupant of the vehicle.

2. Description of Related Art

In the related art, an occupant protection device for a vehicle that detects a collision of an object with the vehicle to protect an occupant has been suggested.

For example, a collision determination device including wall side acceleration sensors provided in both walls of a vehicle and a central side acceleration sensor provided in a central portion of a vehicle is known (for example, see Japanese Unexamined Patent Application Publication No. 11-180249 (JP 11-180249 A)). In the above-described collision determination device, an acceleration detected by the wall side acceleration sensors and the central side acceleration sensor is integrated, and when the integral value exceeds a threshold, a comparator generates a comparison output. An occupant protection device is started based on the comparison output.

Furthermore, an occupant protection device including a side collision prediction sensor configured to predict a collision with a side surface of a vehicle and a side collision sensor configured to detect a collision with the side surface of the vehicle is known (for example, see Japanese Unexamined Patent Application Publication No. 2007-253720 (JP 2007-253720 A)). In the above-described occupant protection device, a collision with the side surface of the vehicle is predicted by the side collision prediction sensor, and when determination is made that the collision with the side surface of the vehicle occurs based on an impact on the side surface of the vehicle detected by the side collision sensor, the occupant protection device is started.

SUMMARY

However, in order to suppress an erroneous operation of the occupant protection device, in a case where a threshold for starting the occupant protection device is set with respect to a detection value of the side collision sensor, when a collision having a detection value smaller than the set threshold occurs, there is a possibility that the occupant protection device is not started. For example, in a case where the magnitude of a collision with a side surface of a vehicle cabin is set as a threshold for starting the occupant protection device, a side collision with a front fender has a detection value smaller than that of the collision with the side surface of the vehicle cabin, and the occupant protection device is not started.

In a case where an object, such as another vehicle, approaches at a high speed and collides with a side of a host vehicle, a timing at which the occupant protection device should be started is made in a shorter time when a relative speed of the host vehicle and the object, such as another vehicle, becomes higher. When the threshold set for suppressing an erroneous operation of the occupant protection device becomes large, a time until the threshold at the time of the collision is reached is extended, and the timing at which the occupant protection device is started is delayed. For this reason, there is a possibility that the occupant protection device is not started at the timing, at which the occupant protection device should be started, due to the relative speed of the host vehicle and the object. Accordingly, there is room for improvement on a technique for protecting an occupant from the collision of the object approaching the side of the host vehicle.

The present disclosure has been accomplished in consideration of the above-described fact, and provides an occupant protection device for a vehicle and an occupant protection method for a vehicle capable of improving occupant protection performance from a collision on a side of a vehicle with a simple configuration.

A first aspect of the present disclosure relates to an occupant protection device for a vehicle. The occupant protection device includes a side collision prediction device, a physical quantity detection device, an airbag device, and an electronic control unit. The side collision prediction device is configured to predict a collision with a side of a host vehicle and output a prediction result including determination about whether or not the predicted collision is an inevitable collision. The physical quantity detection device is configured to detect a physical quantity related to the collision with the side of the host vehicle and output a detection value of the physical quantity. The airbag device is configured to expand to protect an occupant of the vehicle when the airbag device is operated. The electronic control unit is configured to, in a case where the detection value of the physical quantity exceeds a first threshold, perform first control for operating the airbag device, and in a case where the detection value of the physical quantity exceeds a second threshold for a predetermined time from when the side collision prediction device determines that the collision is an inevitable collision, perform second control for operating the airbag device. The second threshold is a value smaller than the first threshold.

According to the first aspect of the present disclosure, the collision with the side of the host vehicle is predicted, and in a case where the detection value of the physical quantity exceeds the second threshold for the predetermined time after determination is made that the predicted collision is an inevitable collision, the airbag device is operated. With this, in the physical quantity detection device, such as a sensor for a side surface collision, even in a case where the physical quantity that is smaller than a threshold usually determined is detected, it is possible to operate the airbag device at an optimum timing with respect to the collision with the side of the host vehicle while suppressing an erroneous operation of the airbag device.

In the occupant protection device according to the first aspect of the present disclosure, the predetermined time may be a time that is determined as a time until the collision in which the airbag device has to be operated occurs from when determination is made that the collision is the inevitable collision. With this, in performing control for operating the airbag device, it is possible to make a time using a threshold having a value smaller than the threshold usually determined be a short time, and to further suppress an erroneous operation of the airbag device. For example, in a case where a collision prediction time to a collision with the host vehicle can be predicted, the side collision prediction device determines the predicted collision prediction time as a predetermined time, whereby it is possible to perform control using a threshold having a small value for a short time.

In the occupant protection device according to the first aspect of the present disclosure, the side collision prediction device may be configured to output a prediction result including a predicted collision position in a case where the collision is the inevitable collision. The physical quantity detection device may be configured to detect a lateral acceleration in a vehicle part according to the predicted collision position as the physical quantity and outputs the detection value.

According to the first aspect of the present disclosure, the lateral acceleration is detected in the vehicle part according to the predicted collision position of the inevitable collision, whereby it is possible to detect an acceleration caused by the inevitable collision at an optimum position. Although a vehicle part where variation in the lateral acceleration appears changes according to a collision position, it is possible to obtain in advance a correspondence relationship between a collision position and a vehicle part where variation in acceleration appears due to a collision at the collision position. For this reason, a vehicle part optimum for detecting the acceleration is determined with the collision at the predicted collision position, and the lateral acceleration is detected in the vehicle part according to the predicted collision position, whereby it is possible to detect an optimum physical quantity.

In the occupant protection device according to the first aspect of the present disclosure, the physical quantity detection device may be configured to, in a case where the predicted collision position is a front fender portion of the host vehicle, detect the lateral acceleration in a central portion of the host vehicle. The physical quantity detection device may be configured to, in a case where the predicted collision position is a cabin portion of the host vehicle, detect the lateral acceleration in a side portion of the host vehicle.

According to the first aspect of the present disclosure, in a case where the predicted collision position of the inevitable collision is the front fender portion of the host vehicle, the lateral acceleration is detected in the central portion of the host vehicle. In a case of the collision with the front fender portion, for example, a detection value of the lateral acceleration in the central portion of the host vehicle is detected to be greater than a detection value of the lateral acceleration in a side portion near the cabin of the host vehicle. Accordingly, it is possible to obtain a detection value sufficient for performing control for operating the airbag device in a case of the collision with the front fender portion. In a case where the predicted collision position of the inevitable collision is the cabin portion of the host vehicle, the lateral acceleration of the host vehicle is detected in the side portion of the host vehicle. It is preferable that the side portion of the host vehicle is a side portion near the cabin. In a case of the collision with the cabin portion of the host vehicle, variation in the lateral acceleration of the host vehicle remarkably appears in the side portion of the host vehicle. Accordingly, it is possible to obtain a detection value sufficient for performing control for operating the airbag device in a case of the collision with the cabin portion. Then, the side portion near the cabin is determined as the vehicle part, whereby it is possible to obtain a more preferable detection value.

In the occupant protection device according to the first aspect of the present disclosure, the side collision prediction device may be configured to output a prediction result including a predicted relative speed of a collision prediction object and the host vehicle in a case where determination is made that the collision is the inevitable collision. The electronic control unit may be configured to perform the second control in a case where the predicted relative speed is equal to or higher than a predetermined speed determined in advance.

According to the first aspect of the present disclosure, as a condition of performing the control for operating the airbag device, a case where the predicted relative speed is equal to or higher than the predetermined speed determined in advance is added to the conditions. For this reason, it is possible to suppress an erroneous operation at the time of a minor collision or the like that is likely to occur in a case of operating the airbag device using a threshold having a small value.

In the occupant protection device according to the first aspect of the present disclosure, the side collision prediction device may be configured to output a prediction result including a predicted relative speed of a collision prediction object and the host vehicle in a case where determination is made that the collision is the inevitable collision. The electronic control unit may be configured to, in the second control, delay a timing of operating the airbag device by a delay time determined based on the predicted relative speed from when the detection value exceeds a value smaller than the second threshold.

According to the first aspect of the present disclosure, the timing of operating the airbag device is delayed by the delay time determined based on the predicted relative speed. For example, in a case where the operation timing is too early, the airbag device cannot obtain the internal pressure of the airbag effective for occupant protection. In a case where the operation timing is too late, sufficient airbag expansion cannot be obtained. Accordingly, the timing of operating the airbag device is adjusted according to the delay time determined based on the predicted relative speed, for example, is adjusted such that the higher the predicted relative speed, the shorter the delay time, whereby it is possible to operate the airbag device at a timing effective for occupant protection, and to improve occupant protection performance.

In the occupant protection device according to the first aspect of the present disclosure, the side collision prediction device may be configured to output information indicating that the side collision prediction device is operated normally. The electronic control unit may be configured to, in a case where the side collision prediction device is operated normally, perform control for operating the airbag device.

According to the first aspect of the present disclosure, a case where the side collision prediction device is operated normally is added to the conditions, and the control for operating the airbag device is performed. For this reason, it is possible to suppress an erroneous operation due to abnormal data or the like in a case where the side collision prediction device is not operated normally, for example, in a case where the side collision prediction device is stopped or abnormal.

A second aspect of the present disclosure relates to an occupant protection method for a vehicle. The occupant protection method includes, with an electronic control unit, predicting a collision with a side of a host vehicle and outputting a prediction result including determination about whether or not the predicted collision is an inevitable collision; detecting a physical quantity related to the collision with the side of the host vehicle and outputting a detection value; performing first control for operating an airbag device in a case where the detection value exceeds a first threshold, the airbag device being configured to expand to protect an occupant of the vehicle when the airbag device is operated; and in a case where determination is made that the prediction result is an inevitable collision, performing second control for operating the airbag device in a case where the detection value exceeds a second threshold for a predetermined time from the determination. The second threshold is smaller than the first threshold.

According to the second aspect of the present disclosure, in the physical quantity detection device, such as a sensor for a side surface collision, even in a case where the physical quantity that is smaller than a threshold usually determined is detected, it is possible to operate the airbag device at an optimum timing with respect to the collision with the side of the host vehicle while suppressing an erroneous operation of the airbag device.

As described above, according to the aspects of the present disclosure, it is possible to improve the occupant protection performance of a vehicle with a simple configuration.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, an example of an embodiment of the present disclosure will be described in detail.

First Embodiment

Figure 1:
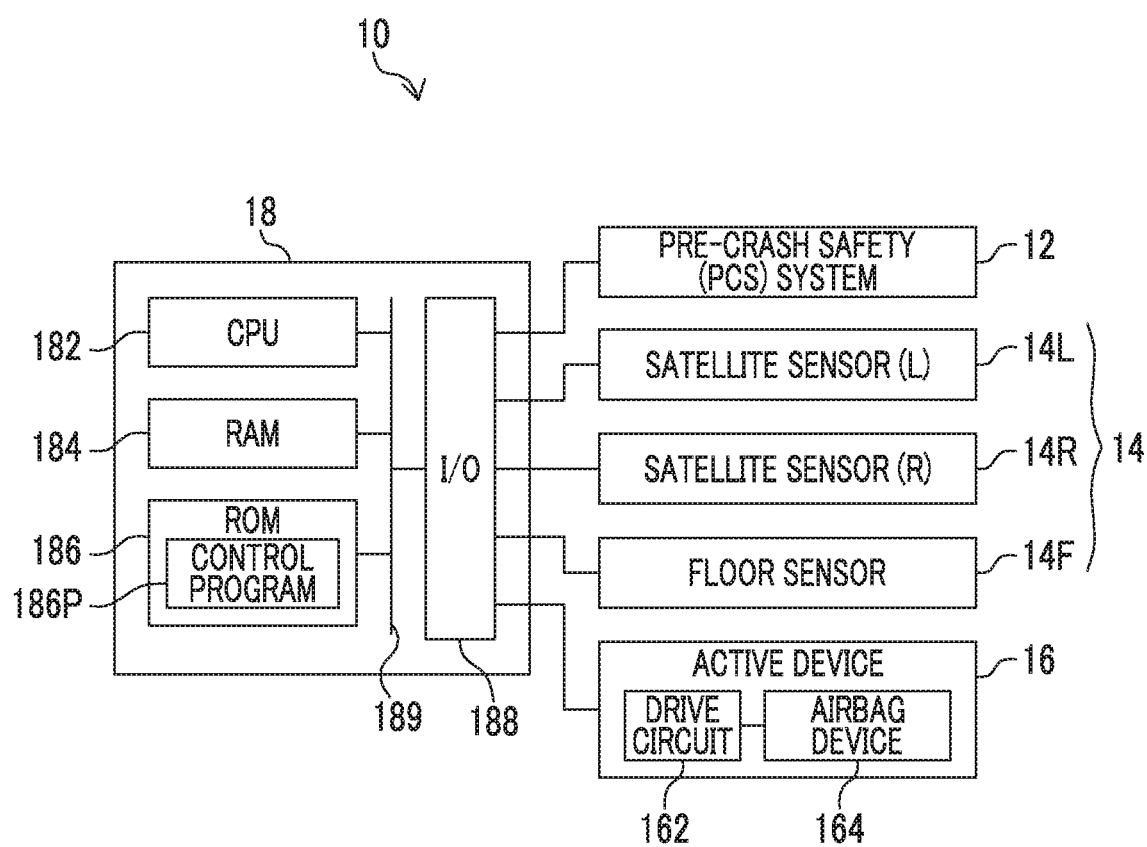
FIG. 1 is a block diagram showing an example of the configuration of an occupant protection device for a vehicle according to a first embodiment.
Figure 2:
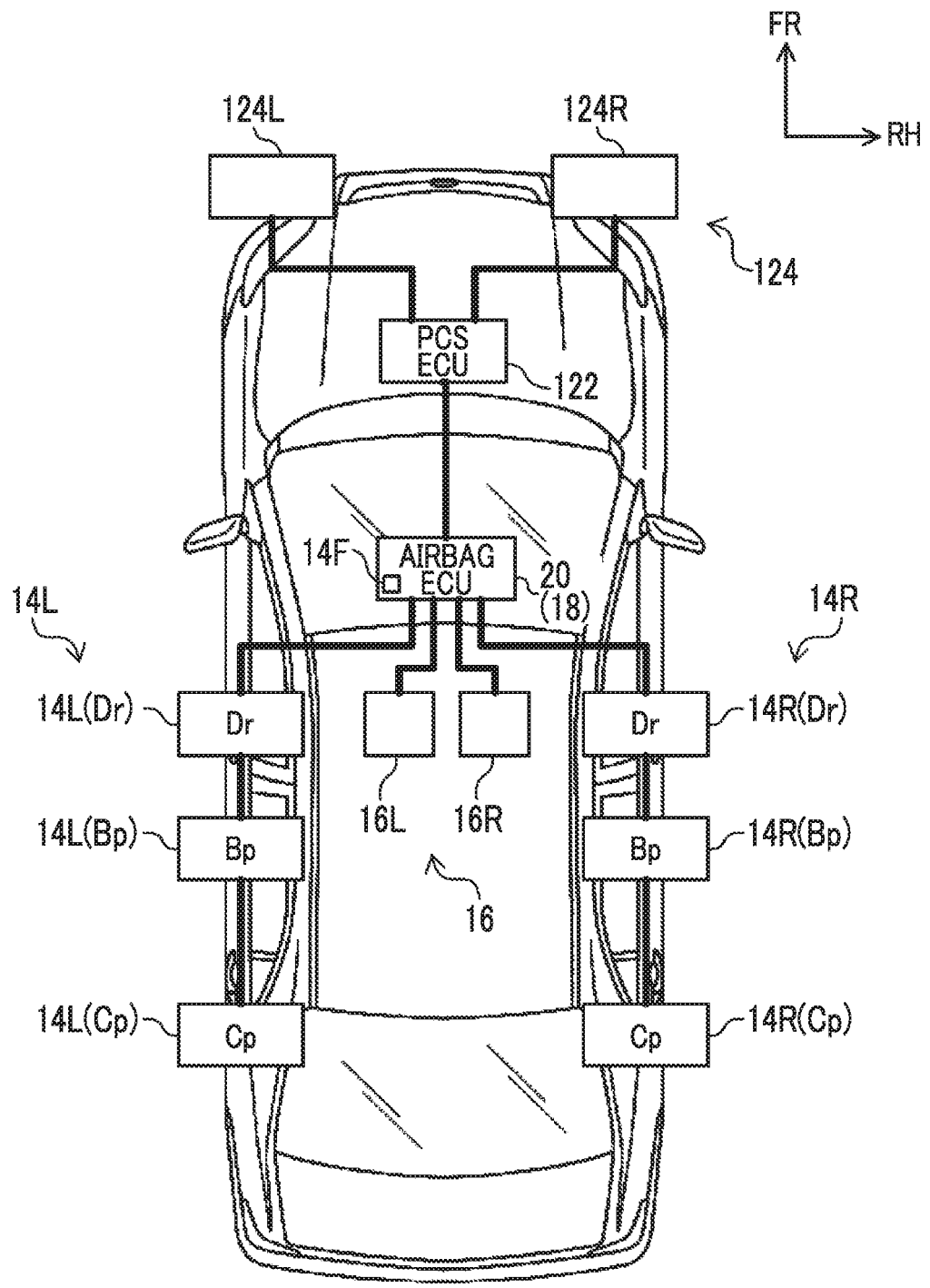
FIG. 2 is a conceptual diagram showing an example of arrangement of detectors according to the first embodiment.

FIG. 1 shows an example of the configuration of an occupant protection device 10 for a vehicle according to an embodiment. FIG. 2 shows an example of arrangement of detectors for detecting various physical quantities related to a vehicle according to the embodiment. In the drawing, an arrow FR indicates toward the front of the host vehicle, and an arrow RH indicates toward the right of the host vehicle.

As shown in FIG. 1, the occupant protection device 10 for a vehicle includes an electronic control unit 18 that performs various kinds of control for protecting an occupant from a collision of an object. The electronic control unit 18 is constituted of a computer including a CPU 182, a RAM 184, a ROM 186, and an I/O 188, and the CPU 182, the RAM 184, the ROM 186, and the I/O 188 are connected through a bus 189 to be transmittable and receivable commands and data.

The ROM 186 stores a control program 186P for protecting an occupant of the host vehicle, a threshold for detecting a collision, and the like, and the CPU 182 executes the control program 186P stored in the ROM 186, whereby control for protecting an occupant of the host vehicle is performed (details will be described below). The RAM 184 is used as a cache memory in a case of executing the program, or the like.

A pre-crash safety system (hereinafter, referred to as a PCS system) 12, a vehicle state sensor 14, and an active device 16 including an airbag device 164 are connected to the I/O 188.

FIG. 2 shows a case where the electronic control unit 18 is applied to an airbag electronic control unit (ECU) 20 that performs control processing of the active device 16, or the like for protecting an occupant of the host vehicle using the airbag device 164 provided near the center of the front side of the vehicle. That is, the airbag ECU 20 shown in FIG. 2 operates as the electronic control unit 18 shown in FIG. 1.

The PCS system 12 is a system that detects an object, such as a vehicle (another vehicle), an obstacle, or the like in front of the host vehicle, predicts a collision with the object, and performs control for reducing damage caused at the time of a collision of the object with the host vehicle. As in an example shown in FIG. 2, the PCS system 12 is constituted of a computer including a CPU, a ROM, a RAM, and an I/O (not shown), and includes a PCS ECU 122 to which pre-crash safety sensors (hereinafter, referred to as a PCS sensor) 124 are connected.

The PCS sensors 124 are provided on the left side and the right side of the vehicle, respectively, and detect at least a relative position of an object around the vehicle with respect to the vehicle. As an example of the PCS sensors 124, an in-vehicle camera that detects an object through imaging and an in-vehicle radar that scans the front direction of the vehicle to detect an object are exemplified. In the example shown in FIG. 2, a PCS sensor 124R that detects the right in front of the host vehicle using the in-vehicle radar, and a PCS sensor 124L that detects the left in front of the host vehicle using the in-vehicle radar are provided.

Each of the PCS sensors 124R, 124L sends an electric wave, such as a millimeter wave or a micro-wave, to another vehicle and an object around the vehicle, such as an obstacle (for example, in a direction at substantially right angles with respect to a traveling direction). Then, the right PCS sensor 124R detects, based on a reflected wave from an object on the right side of the vehicle, for example, a position (the distance between the vehicle and the object) of the right object and a relative moving direction and moving speed (approach speed) of the right object with respect to the vehicle. The left PCS sensor 124L detects, based on a reflected wave from an object on the left side of the vehicle, for example, a position (the distance between the vehicle and the object) of the left object and a relative moving direction and moving speed (approach speed) of the left object with respect to the vehicle.

The PCS system 12 calculates the distance and a relative moving direction between the object and the vehicle based on, for example, the relative position of the object detected by each of the PCS sensors 124R, 124L and performs differential processing on the distance to calculate a moving speed of the object with respect to the vehicle. The PCS system 12 predicts a collision of the object with the vehicle from the distance and the relative moving direction between the object and the vehicle, and the moving speed (relative speed). In a case where a collision is predicted, a time until the object collides with the vehicle and a position on the vehicle where the object collides are predicted.

The PCS ECU 122 transmits calculated information and predicted information to (the airbag ECU 20 that operates as) the electronic control unit 18.

In the embodiment, as an example of information transmitted from the PCS ECU 122, information indicated in items shown in the following table is used.

TABLE 1

| Item | Information Value | Information Content |
| --- | --- | --- |
| Collision Prediction Time | T [sec] | How many seconds later collision occurs |
| Collision Speed (Relative Speed) | V [km/h] | Lateral relative speed of vehicle |
| Collision Prediction Position | P [Position Number] | Position where collision occurs |
| PCS Sensor State | "Normal", "Failure", or the like | "Normal", "Failure38 , or the like indicating state |

Information indicating a collision prediction time is a time T (second) until a predicted collision with the host vehicle occurs after an object is detected by the PCS sensors 124R, 124L. Information indicating a collision speed is a relative speed V (km/h) as a predicted lateral relative speed of the host vehicle at the time of the predicted collision. Information indicating a collision prediction position as a predicted collision position is a position on the vehicle where the predicted collision occurs (details will be described below). Information indicating a PCS sensor state is a state value indicating a state of whether or not the PCS sensor 124 is operated normally, fails, or the like.

When a collision with an object is predicted, the PCS ECU 122 can determine whether or not the predicted collision is an inevitable collision. The determination result, that is, information indicating that the collision is an inevitable collision may be transmitted to (the airbag ECU 20 that operates as) the electronic control unit 18. For example, a case where the collision prediction time is less than 0.6 seconds may be determined to be an inevitable collision using values in items shown in the following table.

Figure 3:
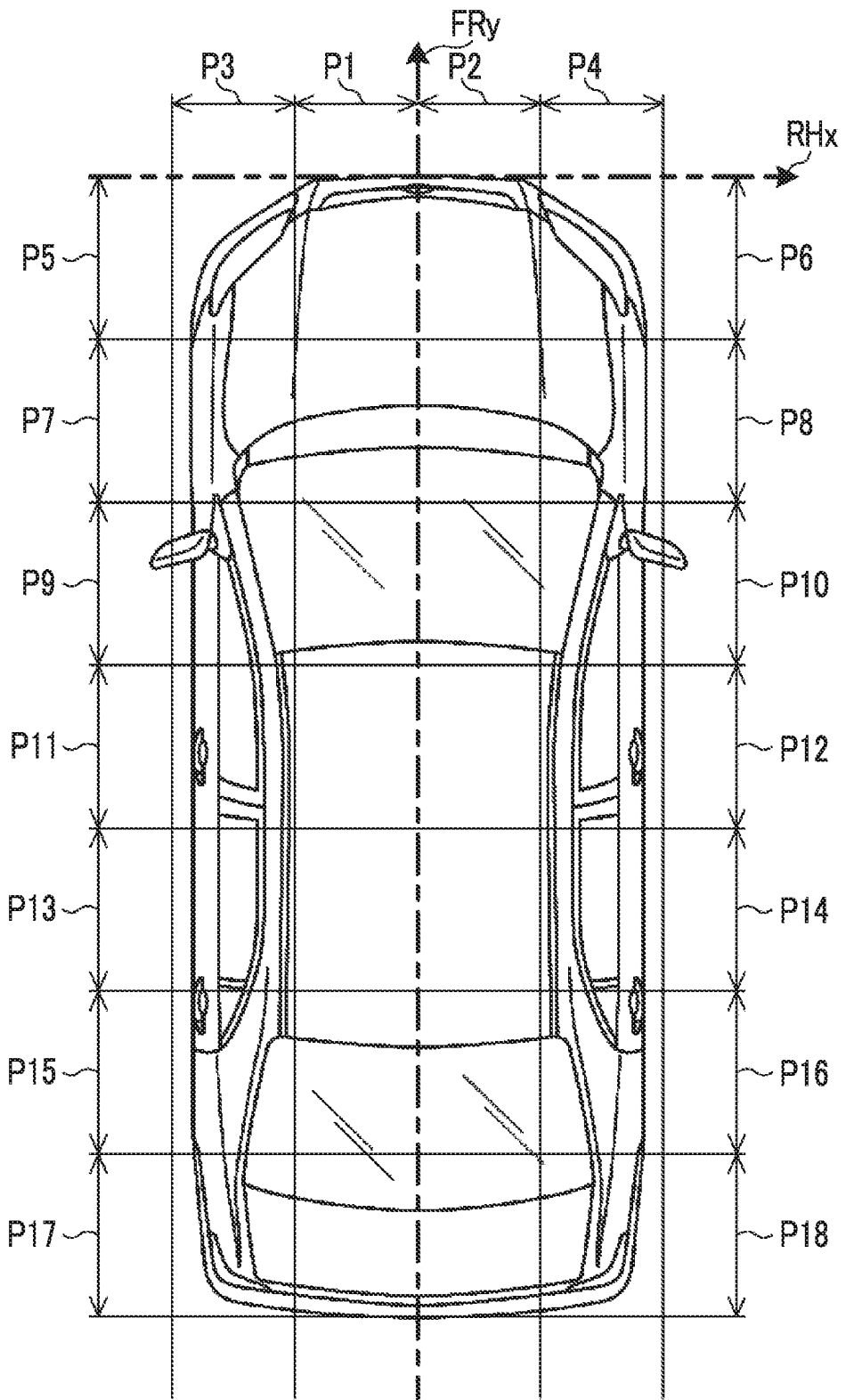
FIG. 3 is a conceptual diagram showing an example of a position map for specifying a collision prediction position according to the first embodiment.

Next, information indicating the collision prediction position of information transmitted from the PCS ECU 122 to (the airbag ECU 20 that operates as) the electronic control unit 18 will be described. FIG. 3 shows an example of a position map for specifying a collision prediction position. The collision prediction position specifies the vicinity of the vehicle with divided areas obtained by dividing the vehicle vertically and horizontally. In the example shown in FIG. 3, the collision prediction position is represented with divided areas obtained by dividing the vehicle into four parts in a direction along a vehicle traveling direction and dividing the vehicle into seven parts in a direction along a vehicle width direction. Specifically, the vehicle is divided into four parts in a direction along the front direction (vehicle traveling direction) FR of the host vehicle and based on an arrow FRy indicating a direction passing the vehicle center. The vehicle is divided into seven parts in a direction along the right direction RH of the host vehicle and based on an arrow RHx indicating a direction passing near the front edge of the vehicle. Then, for the front of the vehicle in the vicinity of the vehicle, positions P1 to P4 are determined such that a number increases from left to right in the vehicle width direction based on the arrow FRy. For the sides of the vehicle in the vicinity of the vehicle, positions P5 to P18 are determined such that a number increases from the front of the vehicle toward the rear of the vehicle and from left to right. In FIG. 3, although a case where the vicinity of the vehicle is specified with the divided areas obtained by dividing the vehicle into 4×7 parts vertically and horizontally is shown, an applicable embodiment of the present disclosure is not limited to 4×7 divisions, and the number of divisions may be increased or decreased. The size of each of the divided areas obtained by dividing the vehicle vertically and horizontally is not limited to dividing the vehicle into the common size. For example, the size of each of the divided areas may be changed.

Information values indicating the positions P1 to P18 specified in the position map shown in FIG. 3 are numerical values of 1 to 18, respectively. Accordingly, information indicating the collision prediction position becomes a numerical value corresponding to one of the positions P1 to P18 specified in the position map shown in FIG. 3.

The vehicle state sensor 14 shown in FIG. 1 is a sensor that detects a state of the vehicle. The vehicle state sensor 14 includes a sensor that detects a physical quantity related to a collision, in particular, a side collision and outputs a detection value. In the embodiment, as an example of the vehicle state sensor 14, a satellite sensor 14R provided on a right side of the vehicle, a satellite sensor 14L provided on a left side of the vehicle, and a floor sensor 14F provided on a central side of the vehicle are provided.

The satellite sensor 14R is an acceleration sensor that functions as a right side collision sensor, and primarily detects a vehicle lateral acceleration on the right of the vehicle. The satellite sensor 14L is an acceleration sensor that functions as a left side collision sensor, and primarily detects a vehicle lateral acceleration on the left of the vehicle.

In the embodiment, as an example of the satellite sensor 14R, as shown in FIG. 2, a right side collision door sensor 14R(Dr) provided near a right door (inside the right door) of the vehicle, a right side collision B pillar sensor 14R(Bp)

provided near a center pillar (B pillar) at the center of a right wall of the vehicle, and a right side collision C pillar sensor 14R(Cp) provided near a pillar (C pillar) at the rear of the right wall of the vehicle are included. Similarly, in the satellite sensor 14L, a left side collision door sensor 14L(Dr) provided near a left door (inside the left door) of the vehicle, a left side collision B pillar sensor 14L(Bp) provided near a center pillar (B pillar) at the center of the left wall of the vehicle, and a left side collision C pillar sensor 14L(Cp) provided near a pillar (C pillar) at the rear of the left wall of the vehicle are included.

The floor sensor 14F included in the vehicle state sensor 14 is a sensor that detects the state of the vehicle, and is an acceleration sensor that detects a vehicle lateral acceleration in a central portion of the vehicle. In the example shown in FIG. 2, an acceleration sensor that is embedded in the airbag ECU 20 provided at the center of the vehicle is used as the floor sensor 14F.

Each of the satellite sensor 14R, the satellite sensor 14L, and the floor sensor 14F transmits the detected acceleration to (the airbag ECU 20 that operates as) the electronic control unit 18. As the acceleration sensor, for example, a semiconductor type G sensor is used.

The active device 16 includes the airbag device 164 that is provided to protect an occupant of the host vehicle, and a drive circuit 162 that drives the airbag device 164. The airbag device 164 makes the drive circuit 162 drive a built-in inflator (not shown) based on a control signal from (the airbag ECU 20 operates as) the electronic control unit 18 and makes an airbag expand. With this, it is possible to protect an occupant.

In FIG. 2, a case where a driver's seat (left) airbag device 16L that protects an occupant seated on the driver's seat, and a front passenger seat right airbag device 16R that protects an occupant seated on the front passenger seat are connected to the airbag ECU 20 is shown as an example. For example, in a case where a driver's seat (left) side airbag device provided in a side portion of the vehicle on the driver's seat side is used as the driver's seat (left) airbag device 16L, and a front passenger seat right side airbag device provided in a side portion of the vehicle on the front passenger seat side is used as the front passenger seat right airbag device 16R, with expansion of each side airbag device, it is possible to protect a side surface of an occupant seated on the driver's seat or the front passenger seat.

As an example of the airbag device 164, at least one of a front airbag device, a headrest airbag device, a curtain airbag device (CSA), a near side airbag device (SAB), and a far side airbag device is exemplified.

With the above-described configuration, (the airbag ECU 20 that operates as) the electronic control unit 18 performs control based on the detection values from the PCS system 12 and the vehicle state sensor 14 such that the active device 16 operates.

In the above description, although a case where the airbag device 164 is used as an example of the active device 16 has been described, an applicable embodiment of the present disclosure is not limited to the airbag device 164. For example, a webbing winding device that restrains an occupant may be used as the active device 16.

Figure 4:
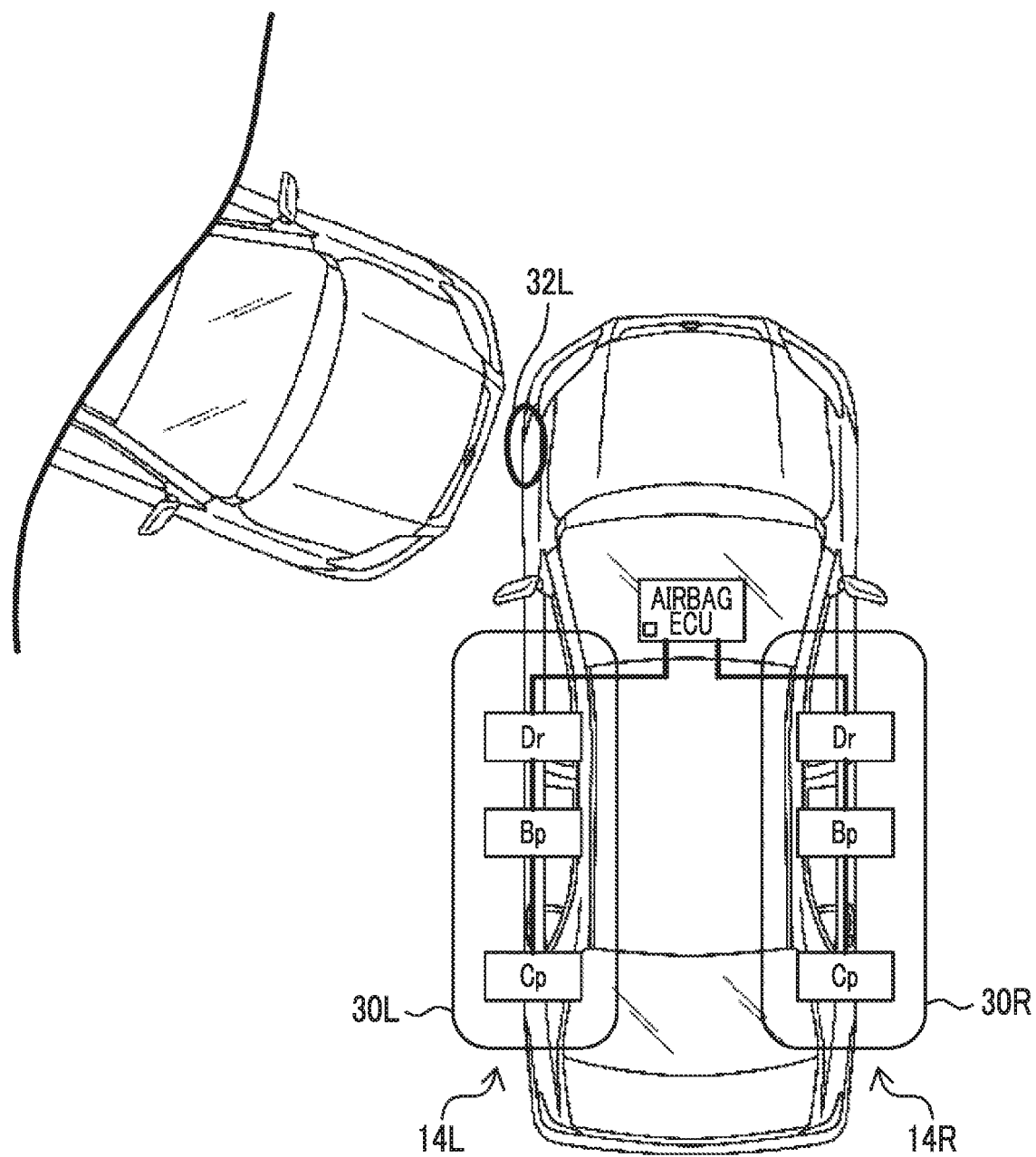
FIG. 4 is a schematic view showing an example of a side collision of another vehicle with a host vehicle according to the first embodiment.

Meanwhile, the airbag device 164 is operated or is not operated according to a collision position of a side collision of another vehicle with the host vehicle. FIG. 4 schematically shows an example of a side collision of another vehicle with the host vehicle. As shown in FIG. 4, the satellite sensors 14R, 14L have areas 30R, 30L where a side collision is detectable, respectively, and can detect a side collision within the areas 30R, 30L. Meanwhile, it is difficult to detect a side collision in a part outside the areas 30R, 30L. For example, in a case of a side collision in an area 32L near a left fender shown in FIG. 4, that is, an area outside the areas 30R, 30L, an impact applied to the satellite sensor 14L is small, and an output of the satellite sensor 14L also becomes small. Accordingly, when a threshold for operating the airbag device 164 is set based on a side collision in the area 30L, in a case of a side collision with the area 32L near the left fender, the threshold is not reached, and the airbag device 164 cannot be operated. In order to operate the airbag device 164 even in a case of a side collision in an area outside the areas 30R, 30L, when the threshold is set small, there is a possibility that an erroneous operation increases that the airbag device 164 operates under a condition of defining a non-operation of the airbag device 164, such as a slight collision. For this reason, there is a limit to making the threshold small.

Accordingly, in the embodiment, the electronic control unit 18 performs processing for detecting a collision in a part outside the areas 30R, 30L where a side collision is detectable. In the following description, a state in which processing is performed for detecting a collision in a part outside the areas 30R, 30L where a side collision is detectable is referred to as an out-of-area collision mode.

In a case of a collision in a part outside an area where a side collision is detectable by each of the satellite sensors 14R, 14L, the output of each of the satellite sensors 14R, 14L becomes small. Since the side collision in this case becomes an oblique collision, the lateral acceleration of the vehicle becomes large in the floor sensor 14F provided in the central portion of the vehicle. Accordingly, the electronic control unit 18 performs side collision determination in the out-of-area collision mode using the lateral acceleration of the vehicle detected by the floor sensor 14F. In order to suppress erroneous detection in the out-of-area collision mode, the electronic control unit 18 performs transition to the out-of-area collision mode in a case where conditions determined in advance are satisfied.

In the embodiment, as an example of the conditions of transition to the out-of-area collision mode, four conditions shown in the following table are used.

TABLE 2

| No. | Propriety Determination Condition | Purpose of Condition |
|---|---|---|
| 1 | Collision prediction time is equal to or less than predetermined value (for example, 0.6 seconds) | Suppress erroneous operation of airbag device in collision with front fender |
| 2 | Collision speed (relative speed) is equal to or higher than predetermined value (for example, 25 km/h) | Set speed effective for airbag device operation in collision with front fender |
| 3 | Collision prediction position is predetermined position (for example, one of 5 to 10) | Confirm collision with front fender |
| 4 | PCS sensor state is normal | Suppress erroneous operation of airbag device due to abnormal data |

The first condition is made that the collision prediction time is immediately before a collision for the purpose of suppressing an erroneous operation of the airbag device 164 in a case of detecting a collision near the front fender as the out-of-area collision mode. For example, a condition is made that the collision prediction time is equal to or less than a predetermined time (0.6 seconds). The second condition is made that the collision speed (relative speed) is equal to or higher than a predetermined value for the purpose of determining a speed effective for operating the airbag device 164 in a case of detecting a collision near the front fender in the out-of-area collision mode. For example, a condition is made that the collision speed (relative speed) is equal to or higher than 25 km/h. The third condition is made that the collision prediction position is a predetermined position for the purpose of confirming to be a collision near the front fender in the out-of-area collision mode. For example, a condition is made that the collision position as the predicted collision position is one of the positions P5 to P10 of the position map shown in FIG. 3, and the information value is a numerical value of 5 to 10. The fourth condition is made that the state of the PCS sensor 124 is normal for the purpose of suppressing an erroneous operation of the airbag device 164 due to an output abnormality of the PCS sensor 124.

In the embodiment, as an example of the condition of transition to the out-of-area collision mode, a case where all of the first condition to the fourth condition are satisfied will be described. Since the condition of transition to the out-of-area collision mode is intended for suppressing an erroneous operation of the airbag device 164 in a case of detecting a collision near the front fender, at least the third condition may be included. Then, more preferably, the third condition and one or a plurality of the first condition, the second condition, and the fourth condition may be combined. A condition combined with the third condition is not limited to at least one of the first condition, the second condition, and the fourth condition, and another condition may be combined with the third condition. Another condition may be further combined with at least one of the first condition, the second condition, and the fourth condition.

Determination is made whether or not each of the first condition to the fourth condition is satisfied using information transmitted from the PCS ECU 122 of the PCS system 12.

Next, side collision determination that is performed in the electronic control unit 18 using the lateral acceleration of the vehicle detected by the floor sensor 14F after transition to the out-of-area collision mode will be described.

Figure 5:
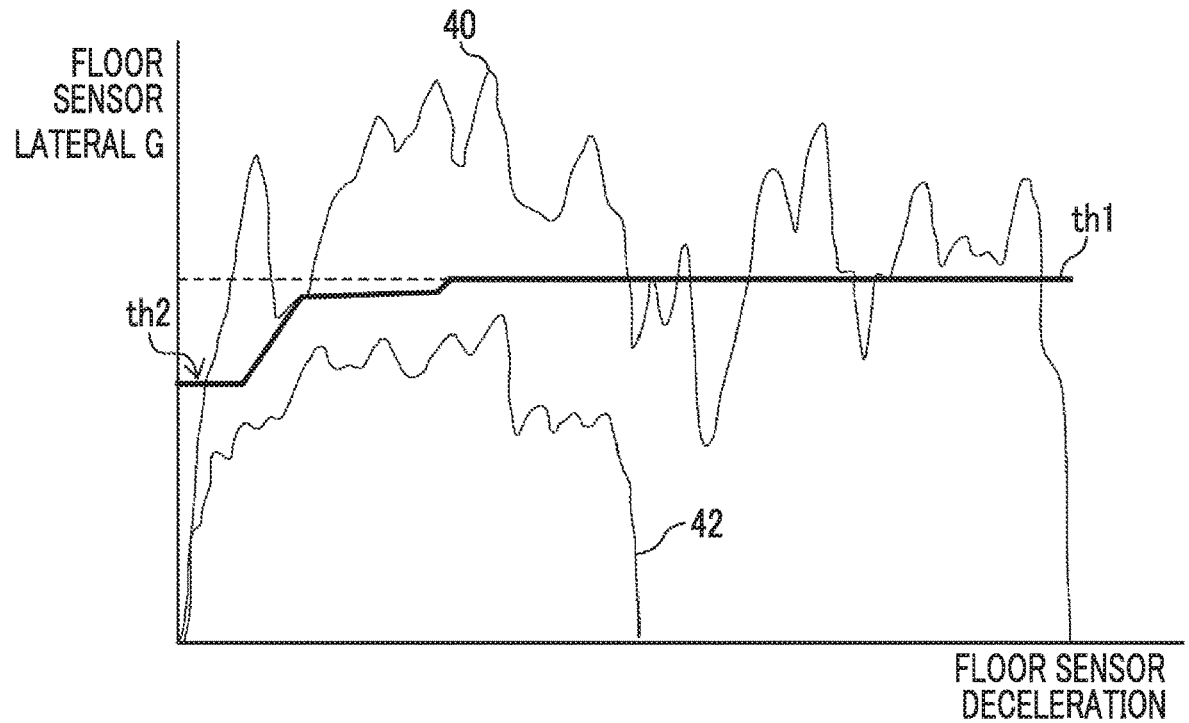
FIG. 5 is a conceptual diagram showing an example of a determination map for determining a collision according to the first embodiment.

FIG. 5 shows an example of a determination map for determining a collision using the lateral acceleration of the vehicle detected by the floor sensor 14F. FIG. 5 plots an output (detection value) of the floor sensor 14F as curves 40, 42 with the vertical axis representing the lateral acceleration of the vehicle detected by the floor sensor 14F and the horizontal axis representing a deceleration (a value obtained by integrating the lateral acceleration of the vehicle detected by the floor sensor 14F once).

The curve 40 indicates an example of an output characteristic of the floor sensor 14F at the time of a collision in which the airbag device 164 should be operated in a part outside the side collision detectable areas 30R, 30L of the satellite sensors 14R, 14L. The curve 42 indicates an example of an output characteristic of the floor sensor 14F that the operation of the airbag device 164 should be suppressed.

As shown in FIG. 5, in the determination map, the output of the floor sensor 14F, that is, a threshold th1 is set for the lateral acceleration in the characteristic indicated by the curve 42 such that the operation of the airbag device 164 is suppressed. In the output of the floor sensor 14F according to the characteristic indicated by the curve 40 having a value greater than the characteristic indicated by the curve 42, in order to determine the operation of the airbag device 164 early, a threshold th2 smaller than the threshold th1, that is, the threshold th2 having a value greater than the acceleration indicated by the curve 42 and smaller than the acceleration indicated by the curve 40 is set.

Next, timing determination at which the airbag device 164 is operated at an optimum timing through the side collision determination performed after transition to the out-of-area collision mode in the electronic control unit 18 will be described. That is, at the time of a collision of an object, such as another vehicle, with the host vehicle, an operation start timing of the airbag device 164 optimum for protecting an occupant according to the relative speed of the object, such as another vehicle, and the host vehicle.

Figure 6:
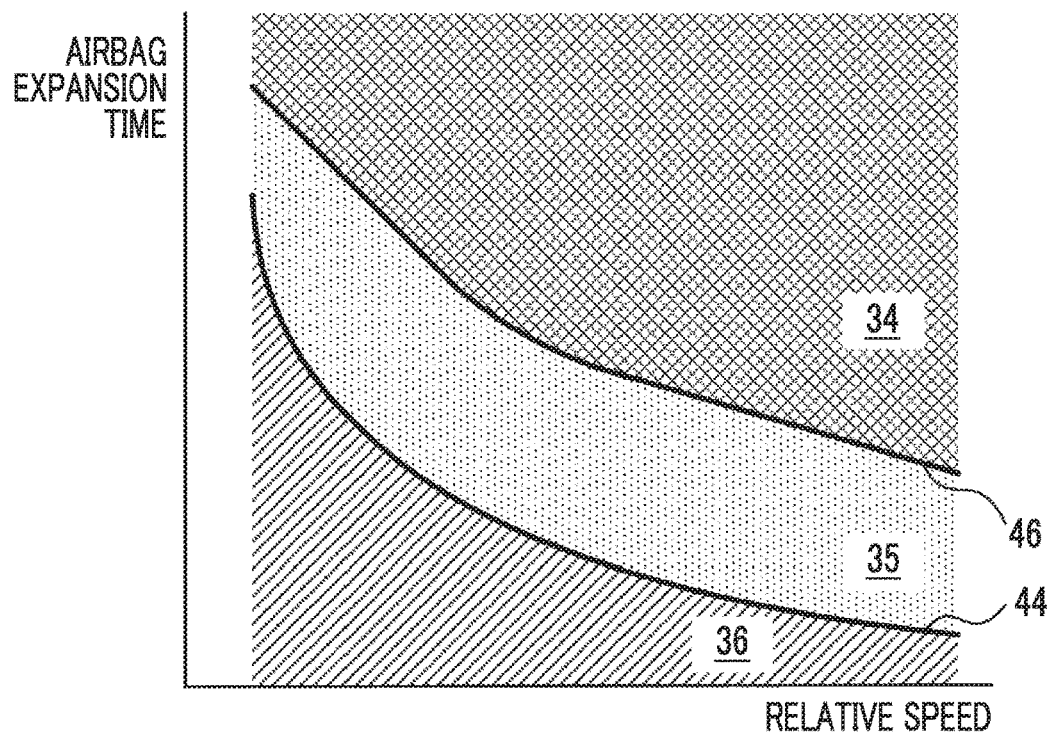
FIG. 6 is a conceptual diagram showing an example of a relationship between an operation start timing of an airbag device and a relative speed according to the first embodiment.

FIG. 6 shows an example of the relationship between the operation start timing of the airbag device 164 and the relative speed. FIG. 6 schematically shows the occupant protection performance of the airbag device 164 in a case where the vertical axis represents an airbag expansion time as an example of the operation start timing of the airbag device 164 and the horizontal axis represents the relative speed.

In a case where the airbag device 164 is operated and the airbag expands, a curve 44 shown in FIG. 6 indicates a boundary between an area 36 where the expansion of the airbag is too early and airbag internal pressure effective for occupant protection is insufficient and an area 35 where the airbag expands effectively for occupant protection. A curve 46 indicates the boundary between the area 35 where the airbag expands effectively for occupant protection and an area 34 where the expansion of the airbag is insufficient and the airbag is in a state of being not effectively interposed between the host vehicle and an occupant. As shown in FIG. 6, in the area 35 where the airbag expands effectively for occupant protection, the faster the relative speed, the shorter the airbag expansion time tends to become.

Accordingly, in the embodiment, in a case of operating the airbag device 164, an optimum timing for protecting an occupant is determined according to the relative speed.

Figure 7:
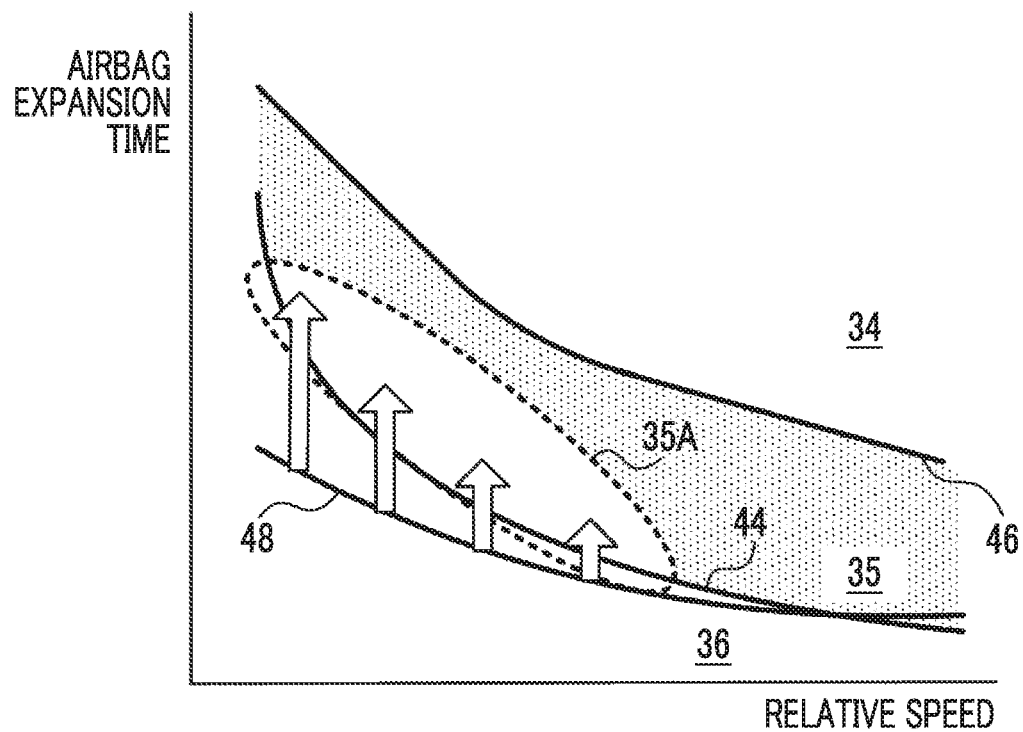
FIG. 7 is a schematic view relating to determination of an optimum timing for occupant protection according to the first embodiment.

FIG. 7 schematically shows an example of a case where the optimum timing for protecting an occupant is determined according to the relative speed. In FIG. 7, as in FIG. 6, the vertical axis represents the airbag expansion time, and the horizontal axis represents the relative speed.

A curve 48 shown in FIG. 7 indicates a characteristic in a case where the airbag device 164 is operated when determination is made that a collision occurs based on the lateral acceleration of the vehicle detected by the floor sensor 14F using the above-described determination map (FIG. 5). As shown in FIG. 7, the characteristic in a case where the airbag device 164 is operated when determination is made that a collision occurs is included in an area 36, the expansion of the airbag is too early, and the airbag internal pressure effective for occupant protection is insufficient. For this reason, a delay is made by a delay time corresponding to the relative speed such that the airbag device 164 is operated at the airbag expansion time of the area 35 corresponding to the relative speed. In the example shown in FIG. 7, the airbag expansion time is adjusted to be delayed by the delay time corresponding to the relative speed such that the airbag device 164 is operated at the airbag expansion time in the delay target area 35A included in the area 35 (in FIG. 7, indicated by a white arrow). With this, the airbag expands effectively for occupant protection, and occupant protection performance can be improved.

In the embodiment, the PCS system 12 is an example of a side collision prediction device of the aspect of the present disclosure, and the vehicle state sensor 14 is an example of a physical quantity detection device of the aspect of the present disclosure. The electronic control unit 18 is an example of an electronic control unit of the aspect of the present disclosure. The active device 16 including the airbag device 164 is an example of an airbag device of the aspect of the present disclosure. The positions P5 to P10 of the position map shown in FIG. 3 are an example of a fender portion of the aspect of the present disclosure, and the positions P11 to P14 are an example of a cabin portion of the aspect of the present disclosure.

Figure 8:
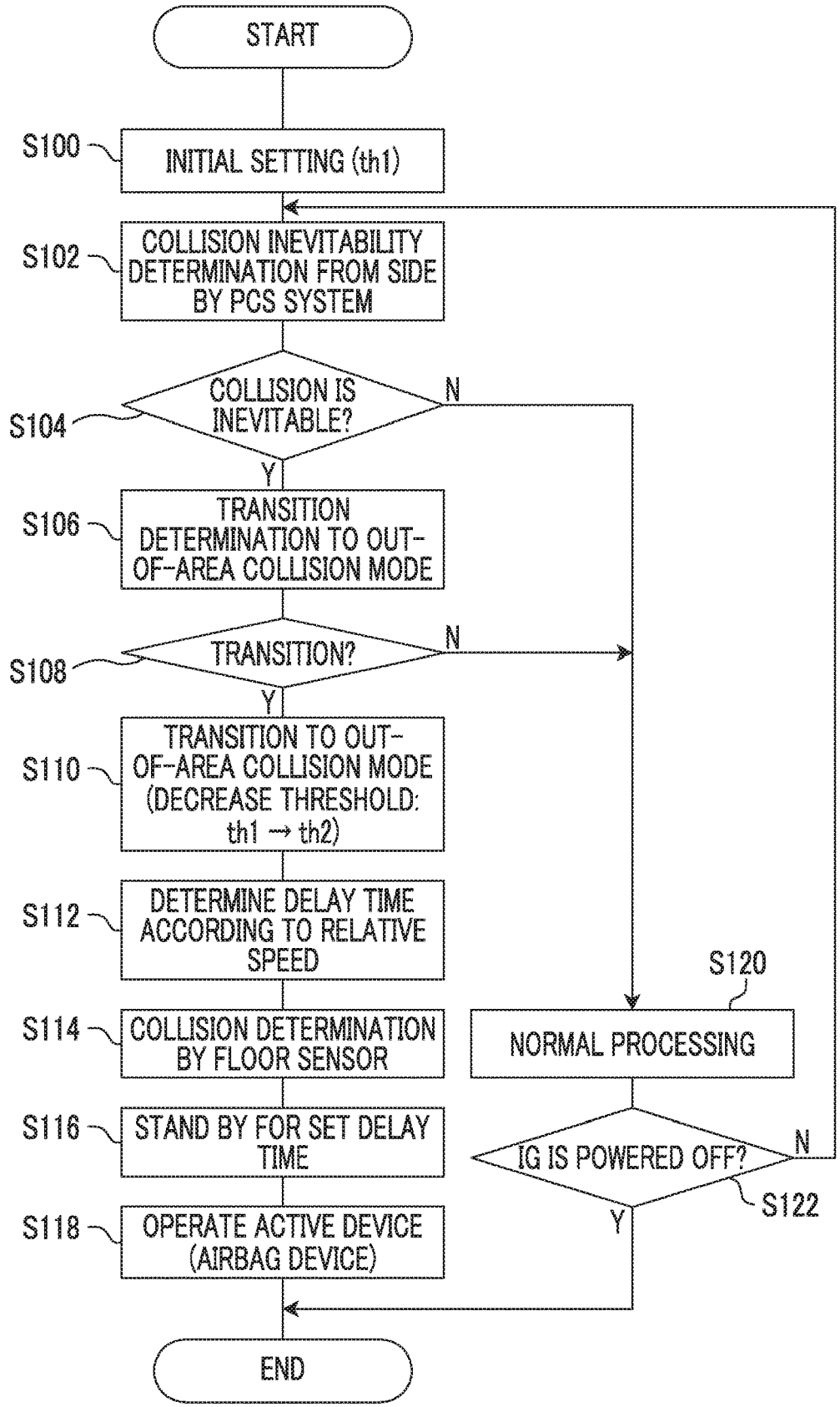
FIG. 8 is a flowchart showing an example of a flow of processing that is performed by the occupant protection device for a vehicle according to the first embodiment.

Next, an example of processing in the occupant protection device 10 for a vehicle according to the embodiment will be described. FIG. 8 shows an example of a flow of processing that is performed by the electronic control unit 18 of the occupant protection device 10 for a vehicle according to the embodiment. In the embodiment, the electronic control unit 18 executes the control program 186P that implements an example of the flow of the processing shown in FIG. 8 and is stored in advance in the ROM 186. The processing of FIG. 8 is started in a case where an ignition switch (not shown) is powered on.

First, in a case where the ignition switch is powered on, in Step S100, an initial setting is performed. In the initial setting of Step S100, as a threshold TH for determining a collision of an object with the vehicle, a first threshold th1 in a normal state is set. That is, the first threshold th1 is read from the ROM 186 and is set as the threshold TH for determining a collision of an object.

In next Step S102, determination is made whether or not a collision predicted by the PCS system 12 is an inevitable collision. Determination of Step S102 is made that the collision is the inevitable collision, for example, in a case where the collision prediction time is less than 0.6 seconds using the values of the items indicated in information (see Table 1) transmitted from the PCS ECU 122. Determination of Step S102 may be performed by the PCS system 12, and a determination result, that is, information indicating the collision is the inevitable collision may be received by the electronic control unit 18.

In next Step S104, determination is made whether or not the collision predicted by the PCS system 12 is an inevitable collision using the determination result of Step S102. In a case where the determination result of Step S104 is affirmative, the process transitions to Step S106. In a case where the determination result of Step S104 is negative, normal processing is performed in Step S120, and in a case where the ignition switch is powered off (in Step S122, affirmative), the processing routine ends. In a case where the determination result of Step S122 is negative, the process returns to Step S102.

In next Step S106, determination is made whether or not transition is made to the out-of-area collision mode. In Step S106, determination is made whether or not the conditions (see Table 2) of transition to the out-of-area collision mode are satisfied using information (see Table 1) transmitted from the PCS ECU 122. Specifically, in a case where all of the first condition to the fourth condition shown in Table 2 are satisfied, determination is made that transition is made to the out-of-area collision mode.

In next Step S108, determination is made whether or not transition is made to the out-of-area collision mode using the determination result of Step S106. In a case where the determination result of Step S108 is affirmative, the process transitions to Step S110, and in a case where the determination result of Step S108 is negative, the process transitions to Step S120.

In Step S110, processing for making transition to the out-of-area collision mode is performed. In Step S110, as the threshold TH for determining a collision of an object with the vehicle, a second threshold th2 having a value smaller than the first threshold th1 is set from the first threshold th1. That is, the second threshold th2 is read from ROM 186 and is set as the threshold TH.

It is preferable that the second threshold th2 set as the threshold TH is set for a short time for the purpose of suppressing an erroneous operation of the airbag device 164. Accordingly, for example, the second threshold th2 is set as the threshold TH for the collision prediction time (Table 2) obtained from the PCS system 12, whereby it is possible to detect a collision with a small value decreased from the first threshold th1 to the second threshold th2 for a short time for which a collision is predicted. In this case, a set time corresponding to the collision prediction time obtained from the PCS system 12 may be determined, and the electronic control unit 18 may perform control such that the second threshold th2 is set for the set time, while measuring a time with a timer (not shown).

In next Step S112, a delay time according to the relative speed in a case where a collision is predicted is determined (FIG. 7). In next Step S114, collision determination of an out-of-area collision is performed using the acceleration detected by the floor sensor 14F (FIG. 5). In a case where determination is made that a collision occurs in the collision determination of an out-of-area collision in next Step S116, the operation start timing of the airbag device 164 is delayed by standby for the delay time determined in Step S112, and then, in Step S118, the airbag device 164 is operated.

In the embodiment, the processing of Steps S104 to S118 is an example of a function of second control that is performed by an electronic control unit of the aspect of the present disclosure, and the processing of Step S120 is an example of a function of first control that is performed by the electronic control unit of the aspect of the present disclosure.

As described above, in the embodiment, it is possible to detect, from the acceleration detected by the floor sensor 14F, a side collision in an area near a fender where detection is difficult through the normal processing, that is, a part outside the areas 30R, 30L (FIG. 4) where a side collision is detectable by the satellite sensors 14R, 14L provided on the sides of the host vehicle. Accordingly, it is possible to obtain a detection value sufficient for performing a control for operating the airbag device 164, and to operate the airbag device 164 at an optimum timing even in a case of a collision near the fender on the front side of the vehicle. With this, occupant protection performance is further improved.

In the embodiment, the first threshold is changed to the second threshold smaller than the first threshold for the predetermined time in a case where a collision with the side of the host vehicle is predicted. With this, it is possible to detect a collision in the normal state, to detect a side collision near the fender on the front side of the vehicle, and to improve collision detection performance. With a simple configuration in which the threshold for determining a collision of an object is changed for the predetermined time, it is possible to determine a side collision near a fender on the front side of the vehicle. Since the threshold TH is changed to the second threshold th2 for the short time immediately before a collision from the side, it is possible to suppress an unneeded operation resulting in an erroneous operation of the airbag device 164.

In the embodiment, the optimum timing for protecting an occupant is determined according to the relative speed, and the operation of the airbag device 164 is delayed until the determined optimum timing. With this, it is possible to operate the airbag device 164 at the timing at which an occupant protection effect is expectable.

In the embodiment, a countermeasure is made for an unneeded operation resulting in an erroneous operation of the airbag device 164 in the out-of-area collision mode. In the following table, for traveling of the vehicle and force applied to the vehicle that generate an acceleration predicted to cause an erroneous operation of the airbag device 164, a comparison result between the normal processing and the collision determination processing in the out-of-area collision mode of the embodiment is shown.

TABLE 3

| | | Normal Processing Satellite Sensor Determination | Out-Of-Area Collision Mode | | |
|---|---|---|---|---|---|
| | | | (1) Out-of-area collision determination (floor sensor) | (2) Out-of-area collision mode transition determination | (1) & (2) |
| Traveling System | Traveling on rough road (curbstone, bump, or the like) | OFF | ON | OFF (Conditions 1 to 3) | OFF |
| Spiteful Operation | Door Close | | OFF | — | OFF |
| | Kick, Clap, or the like | | ON | OFF (Conditions 1 to 3) | OFF |
| Collision | Slight Collision | | OFF | — | OFF |

As shown in the above-described table, in the out-of-area collision mode in the embodiment, since out-of-area collision determination (Step S114) by the floor sensor 14F and out-of-area collision mode transition determination (Step S106) are combined, like the normal processing, determination that is predicted to cause an erroneous operation of the airbag device 164 is not performed.

In the embodiment, although a case where the processing that is performed by the electronic control unit 18 having a computer configuration is realized through software processing by the control program 186P has been described as an example of the occupant protection device 10 for a vehicle, the occupant protection device 10 for a vehicle may be constituted by hardware including an electronic circuit.

Figure 9:
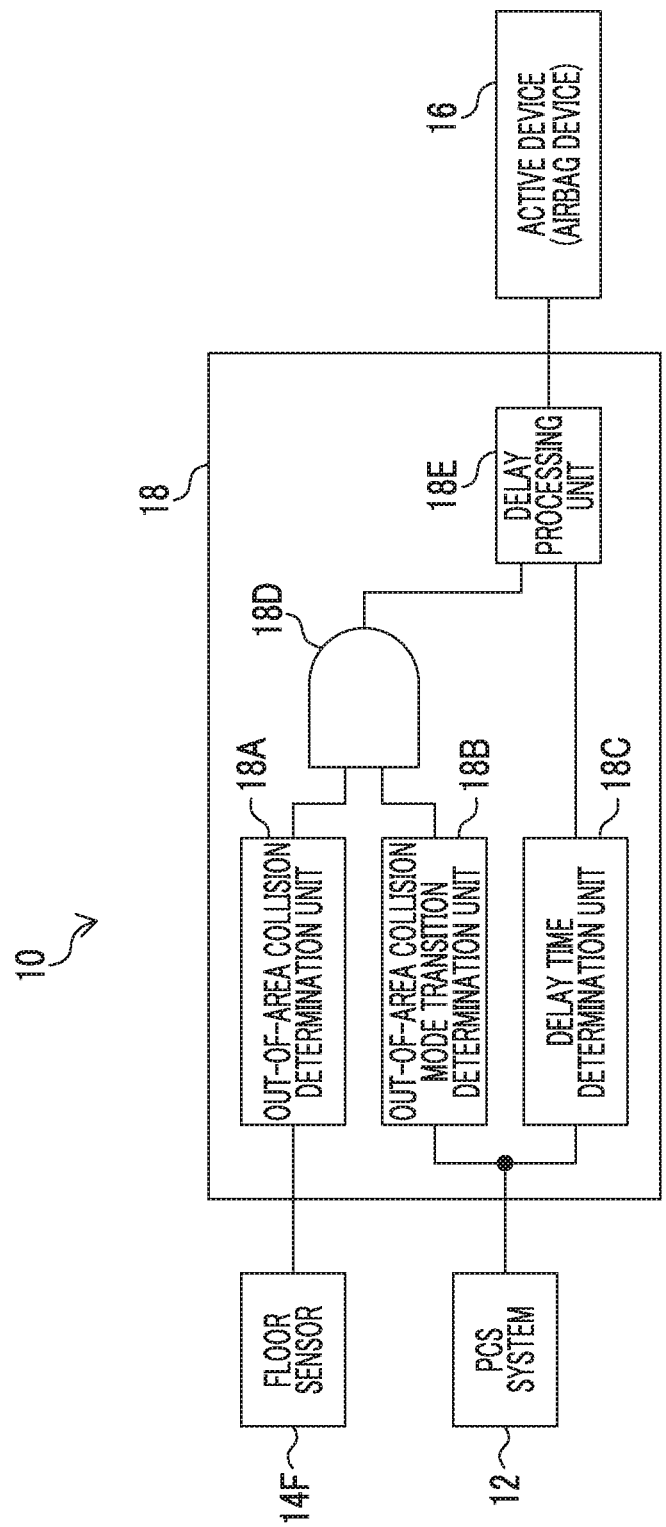
FIG. 9 is a block diagram showing a modification example of an electronic control unit according to the first embodiment.

FIG. 9 is a functional block diagram as a modification example of the electronic control unit 18 included in the occupant protection device 10 for a vehicle. The electronic control unit 18 shown in FIG. 9 includes an out-of-area collision determination unit 18A, an out-of-area collision mode transition determination unit 18B, a delay time determination unit 18C, a logical product (AND) circuit unit 18D, and a delay processing unit 18E. The out-of-area collision determination unit 18A has a function that is performed in Step S114 shown in FIG. 8. The out-of-area collision mode transition determination unit 18B has a function that is performed in Step S106 shown in FIG. 8. The delay time determination unit 18C has a function that is performed in Step S112 shown in FIG. 8. The logical product (AND) circuit unit 18D has a function that is performed as the determination of Step S108 and the determination operation of Step S114 shown in FIG. 8. The delay processing unit 18E has a function that is performed in Step S116 shown in FIG. 8. In the modification example of the electronic control unit 18 shown in FIG. 9, it is also possible to obtain the same effects as in the embodiment.

Second Embodiment

Next, a second embodiment will be described. The second embodiment is an example of a case of protecting an occupant at the time of a side collision near the cabin of the host vehicle at a high speed as a collision with the host vehicle. Since the second embodiment has the same configuration as in the first embodiment, the same portions are represented by the same reference numerals, and detailed description thereof will not be repeated.

Figure 10:
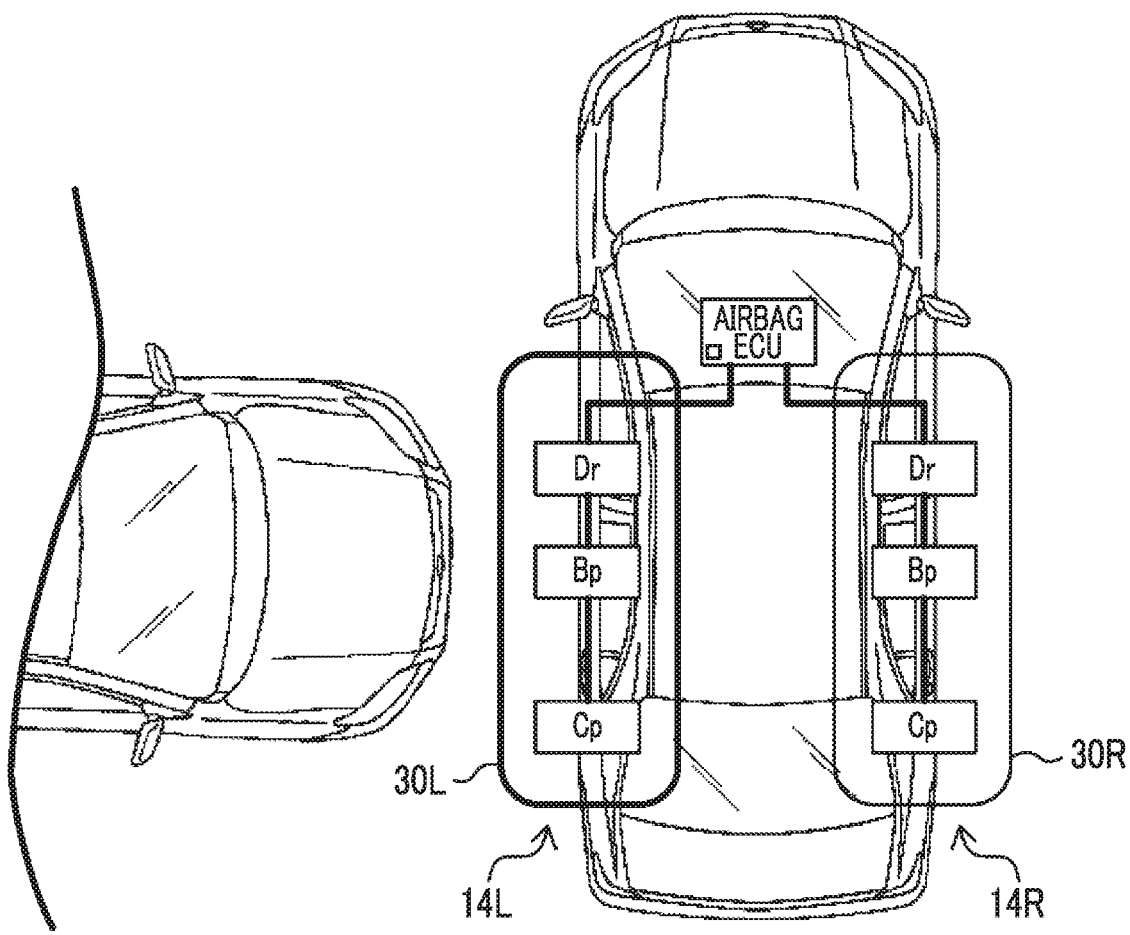
FIG. 10 is a schematic view showing an example of a side collision of another vehicle with a host vehicle according to a second embodiment.

At the time of a collision of an object, such as another vehicle, with the host vehicle, the higher the relative speed of an object, such as another vehicle, and the host vehicle, the earlier the operation start timing of the airbag device 164. FIG. 10 schematically shows an example of a side collision of another vehicle with the host vehicle. As shown in FIG. 10, even in a case where a side collision is detectable within areas 30R, 30L of the satellite sensors 14R, 14L where a side collision is detectable, a situation occurs in which it is not sufficient to protect an occupant in a case where the airbag device 164 is operated. That is, since the higher the relative speed of an object, such as another vehicle, and the host vehicle, the earlier the operation start timing of the airbag device 164, there is a case where the operation of the airbag device 164 is delayed at the time of a side collision near the cabin of the host vehicle at a higher relative speed.

Figure 11:
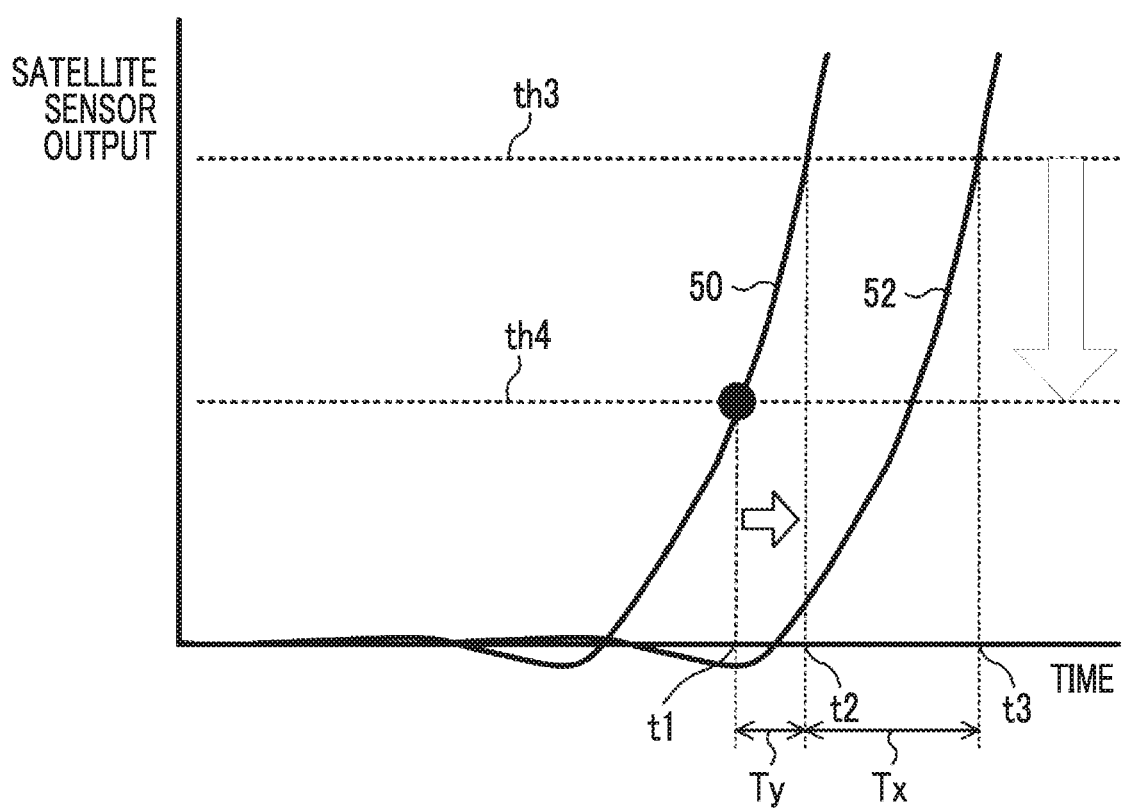
FIG. 11 is a conceptual diagram showing an example of a determination map for determining a collision according to the second embodiment.

FIG. 11 shows an example of a determination map for determining a collision on the left side of the host vehicle using the lateral acceleration of the vehicle detected by each of the satellite sensor 14L and the floor sensor 14F. FIG. 11 may be considered as a temporal characteristic of the output of the satellite sensor 14L that changes according to the relative speed at the time of a collision. FIG. 11 schematically shows a case where the vertical axis represents the output (acceleration) of the satellite sensor 14L, and the horizontal axis represents time in order to show the deceleration (the value obtained by integrating the lateral acceleration of the vehicle detected by the floor sensor 14F once) of the floor sensor 14F.

In FIG. 11, as an example, a curve 50 indicates a characteristic relating to the output (acceleration) of the satellite sensor 14L in a case of a relative speed V1 (for example, 70 km/h) of an object, such as another vehicle, and the host vehicle at the time of a side collision. A curve 52 indicates a characteristic relating to the output (acceleration) of the satellite sensor 14L in a case of a relative speed V2 (for example, 60 km/h).

In a case where the relative speed increases from the relative speed V2 to the relative speed V1, a time until a threshold th3 set during normal time is exceeded becomes early by a time Tx (=t3–t2). Meanwhile, in a case where the relative speed increases, when an optimum operation timing of the airbag device 164 becomes time t1, the operation of the airbag device 164 is delayed by a time Ty (=t2–t1) until the threshold th3 is exceeded. For this reason, a case where the threshold th3 is changed to a threshold th4 having a smaller value is considered. Meanwhile, from a viewpoint of suppressing an erroneous operation, there is a case where it is difficult to change the threshold th3 to the threshold th4 having a smaller value.

Accordingly, in the embodiment, the electronic control unit 18 performs processing for detecting a collision according to the relative speed exceeding a speed determined as a collision safety countermeasure (passive safety countermeasure). In the following description, a state of performing the processing for detecting a collision according to the relative speed exceeding the speed determined as the passive safety countermeasure is referred to as a high-speed collision mode. Then, the threshold is decreased in the high-speed collision mode and a collision is detected.

In order suppress erroneous detection in the high-speed collision mode, the electronic control unit 18 performs transition to the high-speed collision mode in a case where conditions determined in advance are satisfied.

In the embodiment, as an example of the conditions of transition to the high-speed collision mode, four conditions shown in the following table are used.

that the collision position is one of the positions P11 to P14 of the position map shown in FIG. 3, and the information value is a numerical value of 11 to 14. The fourth condition is made that the state of the PCS sensor 124 is normal for the purpose of suppressing an erroneous operation of the airbag device 164 due to an output abnormality of the PCS sensor 124. Transition to the high-speed collision mode is made in a case where all of the first condition to the fourth condition are satisfied.

Determination is made whether or not each of the first condition to the fourth condition is satisfied using information transmitted from the PCS ECU 122 of the PCS system 12.

Figure 12:
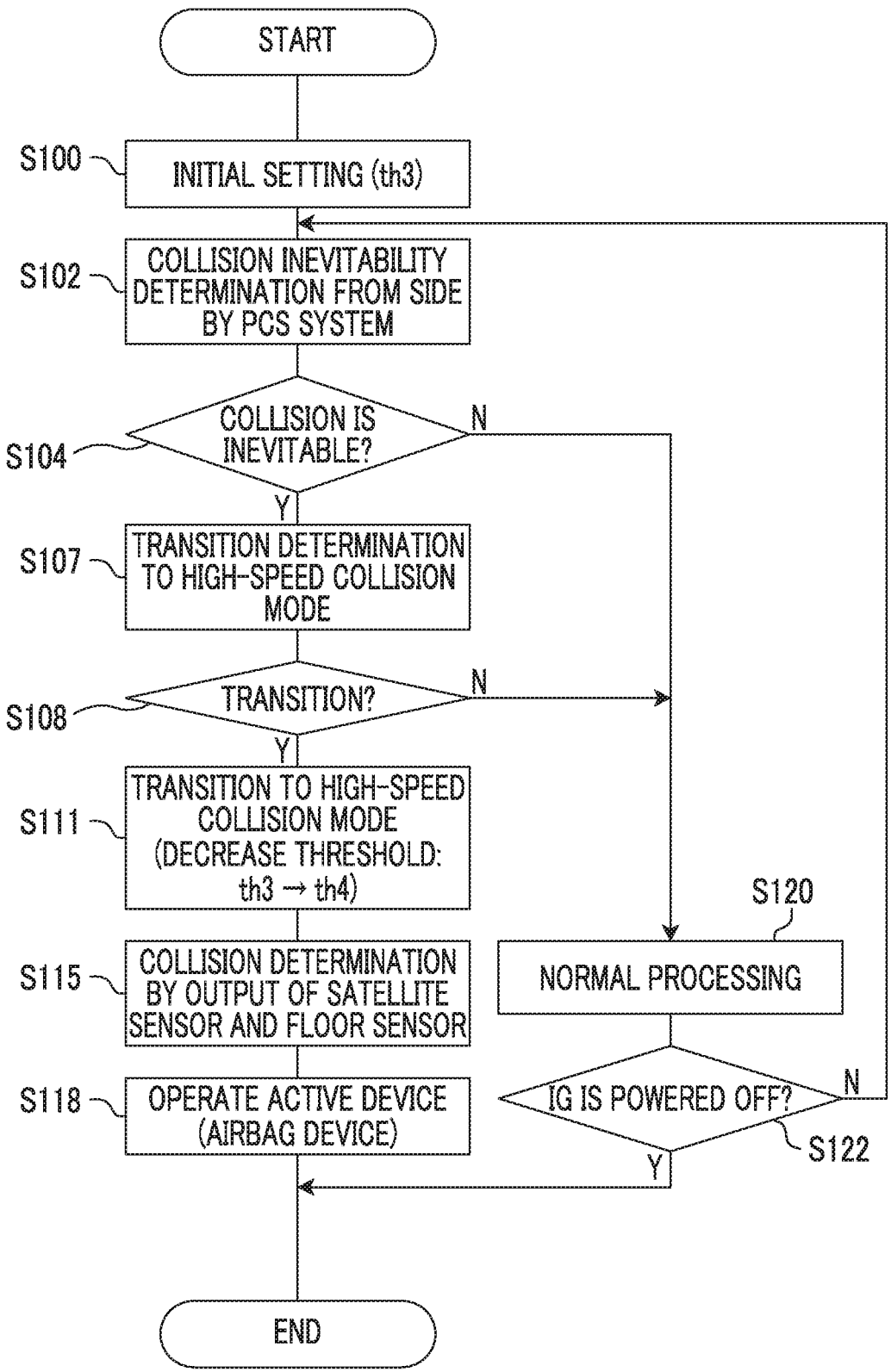
FIG. 12 is a flowchart showing an example of a flow of processing that is performed by an occupant protection device for a vehicle according to the second embodiment.

Next, an example of processing in the occupant protection device 10 for a vehicle according to the embodiment will be described. FIG. 12 shows an example of a flow of processing that is performed by the electronic control unit 18 of the occupant protection device 10 for a vehicle according to the embodiment. The example of the flow of the processing shown in FIG. 12 is substantially the same as the example of the flow of the processing shown in FIG. 8. Differences are that processing of Step S107 is performed instead of the processing of Step S106 shown in FIG. 8, processing of Step S111 is performed instead of the processing of Step S110 shown in FIG. 8, and processing of Step S115 is performed instead of the processing of Step S114 shown in FIG. 8. The processing of Steps S112 and S116 shown in FIG. 8 is not performed and is thus deleted. In the initial setting of Step S100, as the threshold TH for determining a collision of an object with the vehicle, a first threshold th3 in the normal state is set instead of the first threshold th1.

In Step S107, the electronic control unit 18 determines whether or not transition is made to the high-speed collision mode. In Step S107, determination is made whether or not the conditions (see Table 4) of transition to the high-speed collision mode are satisfied using information (see Table 1)

TABLE 4

| No. | Propriety Determination Condition | Purpose of Condition |
|---|---|---|
| 1 | Collision prediction time is equal to or less than predetermined value (for example, 0.6 seconds) | Suppress erroneous operation of airbag device in high-speed collision (near cabin) |
| 2 | Collision speed (relative speed) is equal to or higher than predetermined value (for example, 60 km/h) | Set speed effective for occupant protection |
| 3 | Collision prediction position is predetermined position (for example, one of 11 to 14) | Confirm collision near cabin |
| 4 | PCS sensor state is normal | Suppress erroneous operation of airbag device due to abnormal data |

The first condition is made that the collision prediction time is immediately before a collision for the purpose of suppressing an erroneous operation of the airbag device 164 in a case of detecting a collision near the cabin of the host vehicle as the high-speed collision mode. For example, a condition is made that the collision prediction time is equal to or less than a predetermined time (0.6 seconds). The second condition is made that the collision speed (relative speed) is equal to or higher than a predetermined value for the purpose of determining a speed effective for operating the airbag device 164 in a case of detecting a collision near the cabin of the host vehicle in the high-speed collision mode. For example, a condition is made that the collision speed (relative speed) is equal to or higher than 60 km/h. The third condition is made that the collision prediction position is a predetermined position for the purpose of confirming to be a collision near the cabin of the host vehicle in the high-speed collision mode. For example, a condition is made transmitted from the PCS ECU 122. Specifically, in a case where all of the first condition to the fourth condition shown in Table 4 are satisfied, determination is made that transition is made to the high-speed collision mode.

In next Step S108, determination is made whether or not transition is made to the high-speed collision mode using the determination result of Step S107, in a case where the determination result is affirmative, the process transitions to Step S111, and in a case where the determination result is negative, the process transitions to Step S120.

In Step S111, processing for making transition to the high-speed collision mode is performed. In Step S111, as the threshold TH for determining a collision of an object with the vehicle, a second threshold th4 having a value smaller than the first threshold th3 is set from the first threshold th3. That is, the second threshold th4 is read from the ROM 186 and is set as the threshold TH.

Then, in next Step S115, collision determination of a high-speed collision is performed using the acceleration detected by the floor sensor 14F and the acceleration detected by the satellite sensors 14R, 14L (FIG. 11). In the collision determination of a high-speed collision, in a case where determination is made that a high-speed collision occurs, in next Step S118, the airbag device 164 is operated.

As described above, in the embodiment, it is possible to detect a side collision near the cabin according to a high relative speed to the host vehicle using the acceleration detected by the floor sensor 14F and the acceleration detected by the satellite sensors 14R, 14L without delay. Accordingly, in regard to a collision near the cabin, even in a case of a collision according to a high relative speed, it is possible to operate the airbag device 164 without delay. With this, occupant protection performance is improved.

In the embodiment, as in the first embodiment, a countermeasure is made for an unneeded operation resulting in an erroneous operation of the airbag device 164 in the high-speed collision mode. In the following table, for traveling of the vehicle and force applied to the vehicle that generate an acceleration predicted to cause an erroneous operation of the airbag device 164, a comparison result between the normal processing and the collision determination processing in the high-speed collision mode of the embodiment is shown.

S115 shown in FIG. 12. The high-speed collision mode transition determination unit 18G has a function that is performed in Step S107 shown in FIG. 12. The logical product (AND) circuit unit 18H has a function that is performed as the determination of Step S108 and the determination operation of Step S115 shown in FIG. 12. In the modification example of the electronic control unit 18 shown in FIG. 13, it is also possible to obtain the same effects as in the embodiment.

Modification Example

Next, a modification example where the first embodiment and the second embodiment are combined will be described. Since the modification example has the same configuration as in the first embodiment and the second embodiment, the same portions are represented by the same reference numerals, and detailed description thereof will not be repeated.

The modification example is to protect an occupant by performing processing to detecting a collision in a part outside the areas 30R, 30L where a side collision is detectable or a collision near the cabin of the host vehicle at a high speed as a collision with the host vehicle.

TABLE 5

| | | Normal Processing Satellite Sensor Determination | High-Speed Collision Mode | | |
| --- | --- | --- | --- | --- | --- |
| | | | (1) High-speed collision determination (satellite sensors) | (2) High-speed collision mode transition determination | (1) & (2) |
| Traveling System | Traveling on rough road (curbstone, bump, or the like) | OFF | OFF | — | OFF |
| Spiteful Operation | Door Close | | ON | OFF (Conditions 1 to 3) | OFF |
| | Kick, Clap, or the like | | OFF | — | OFF |
| Collision | Slight Collision | | ON | OFF (Condition 2) | OFF |

As shown in the above-described table, in the high-speed collision mode in the embodiment, high-speed collision determination (Step S115) based on the acceleration detected by the floor sensor 14F and the satellite sensors 14R, 14L and high-speed collision mode transition determination (Step S107) are combined, and like the normal processing, determination that is predicted to cause an erroneous operation of the airbag device 164 is not performed.

In the embodiment, although a case where the processing that is performed by the electronic control unit 18 having a computer configuration is realized through software processing by the control program 186P has been described as an example of the occupant protection device 10 for a vehicle, the occupant protection device 10 for a vehicle may be constituted by hardware including an electronic circuit.

Figure 13:
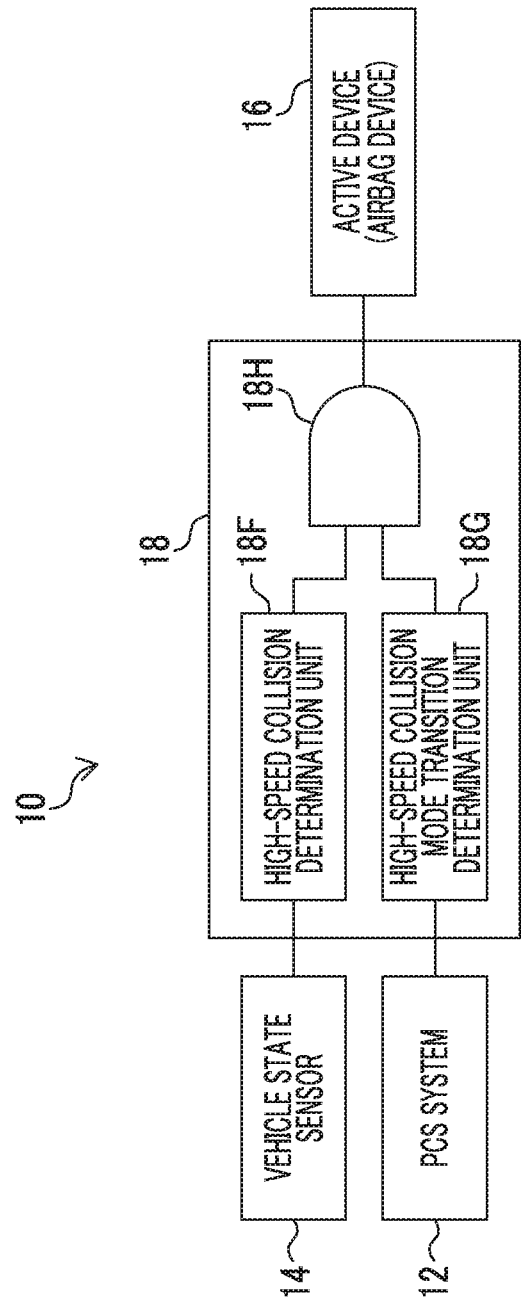
FIG. 13 is a block diagram showing a modification example of an electronic control unit according to the second embodiment.
Figure 14:
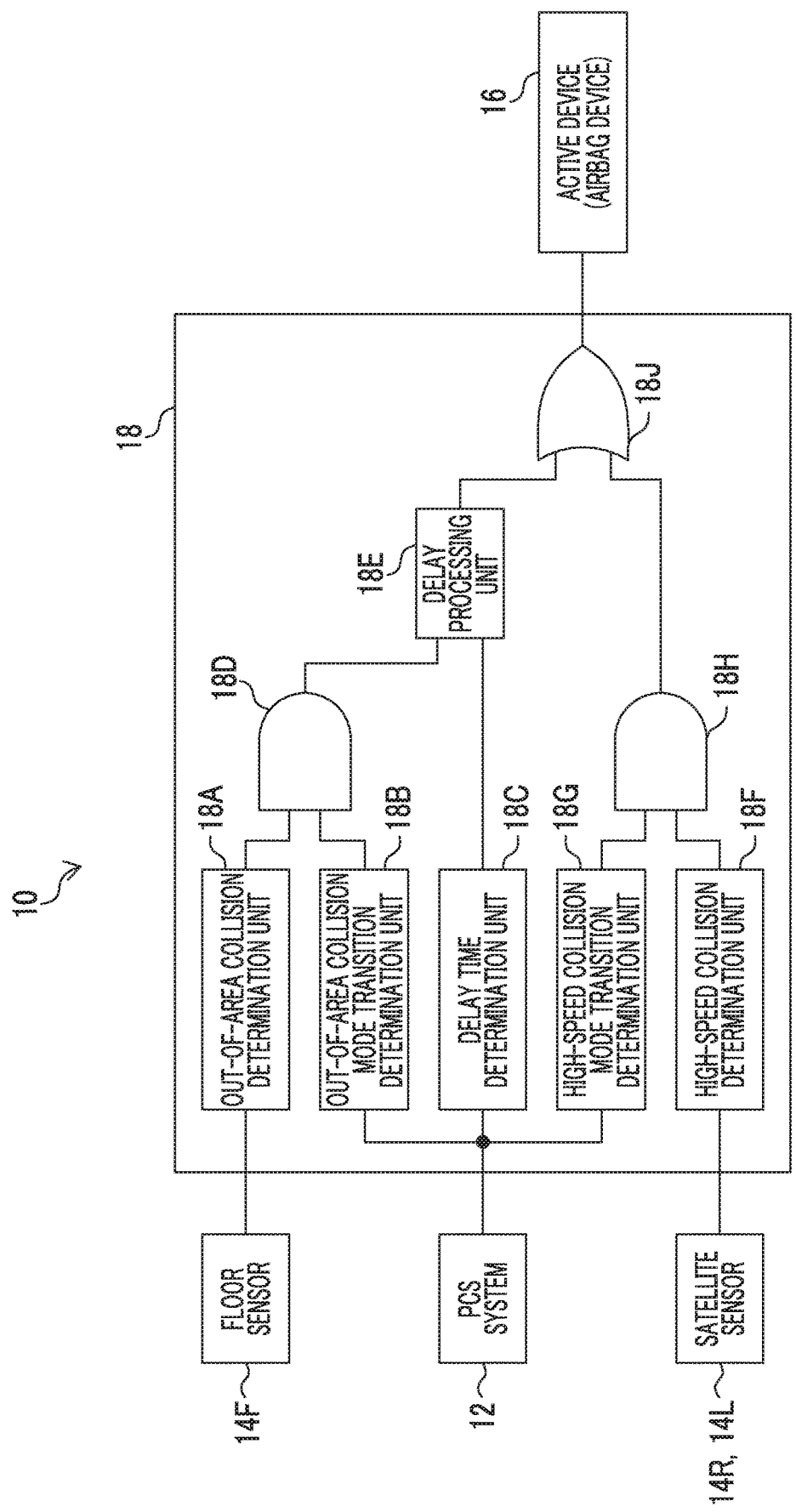
FIG. 14 is a block diagram showing a modification example of an electronic control unit of an occupant protection device for a vehicle in which the first embodiment and the second embodiment are combined.

FIG. 13 is a functional block diagram as a modification example of the electronic control unit 18 included in the occupant protection device 10 for a vehicle. The electronic control unit 18 shown in FIG. 13 includes a high-speed collision determination unit 18F, a high-speed collision mode transition determination unit 18G, and a logical product (AND) circuit unit 18H. The high-speed collision determination unit 18F has a function that is performed in Step FIG. 14 is a functional block diagram of the electronic control unit 18 included in the occupant protection device 10 for a vehicle according to the modification example. The electronic control unit 18 shown in FIG. 14 includes both of the configuration of the electronic control unit 18 shown in FIG. 9 and the configuration of the electronic control unit 18 shown in FIG. 13, and outputs a detection result of a collision in a part outside the areas 30R, 30L where a side collision is detectable and a detection result of a collision near the cabin of the host vehicle at a high speed as a collision with the host vehicle to the active device 16 through a logical sum (OR) circuit unit 18J. The modification example of the electronic control unit 18 shown in FIG. 14 can obtain the same effects as in the first embodiment and the second embodiment.

Although the present disclosure has been described in connection with the embodiment, the technical scope of the present disclosure is not limited to the scope described in the embodiment. Various alterations and improvements can be added to the embodiment without departing from the spirit of the present disclosure, and the forms added with such alterations or improvements are also included in the technical scope of the present disclosure.

What is claimed is:

1. An occupant protection device for a host vehicle, the occupant protection device comprising:
a side collision prediction device configured to predict a collision with a side of the host vehicle and output a prediction result including:
a determination regarding whether the predicted collision is an inevitable collision, and
a determination regarding a collision prediction position in a case where the predicted collision is the inevitable collision;
a physical quantity detection device configured to detect a physical quantity related to the predicted collision with the side of the host vehicle, wherein the physical quantity detection device comprises:
a floor sensor in a central portion of the host vehicle, and
door sensors and pillar sensors on both sides of a cabin portion of the host vehicle
an airbag device configured to expand to protect an occupant of the host vehicle when the airbag device is operated; and
an electronic control unit configured to:
instruct the airbag device to expand in response to a determination that an output from the floor sensor exceeds a first threshold or a determination that an output from the door sensors and the pillar sensors exceeds a third threshold,
instruct the airbag device to expand in response to a determination that the predicted collision is in the cabin portion of the host vehicle and the output from the door sensors and the pillar sensors exceeds the third threshold regardless of the output of the floor sensor, and
instruct the airbag device to expand in response to a determination that the collision prediction position is in a front fender of the host vehicle and the output from the floor sensor exceeds a second threshold for a predetermined time regardless of the output of the door sensors and pillar sensors, the second threshold being smaller than the first threshold, wherein:
the side collision prediction device is configured to output the prediction result including a predicted relative speed of a collision prediction object and the host vehicle in a case where determination is made that the predicted collision is the inevitable collision; and
the electronic control unit is configured to instruct the airbag device to expand in response to a determination that the output from the door sensors and the pillar sensors exceeds a fourth threshold, and the predicted relative speed is equal to or higher than a predetermined speed determined in advance, wherein the fourth threshold is less than the third threshold.

2. The occupant protection device according to claim 1, wherein the predetermined time is a time corresponding to a time until when the predicted collision occurs from when determination is made that the predicted collision is the inevitable collision.

3. The occupant protection device according to claim 1, wherein:
the side collision prediction device is configured to output information indicating that the side collision prediction device is operated normally; and
the electronic control unit is configured to, in a case where the side collision prediction device is operated normally, control operating the airbag device.

4. The occupant protection device according to claim 1, wherein
a first door sensor of the door sensors is in a first door of the host vehicle;
a first pillar sensor of the pillar sensors is in a first pillar of the host vehicle; and
a second pillar sensor of the pillar sensors is in a second pillar of the host vehicle.

5. An occupant protection method for a host vehicle, the occupant protection method comprising:
with an electronic control unit, predicting a collision with a side of the host vehicle and outputting a prediction result including determination about whether the predicted collision is an inevitable collision;
predicting a collision prediction position on the vehicle in response to determining the predicted collision is the inevitable collision;
detecting, using a floor sensor, a first physical quantity related to the predicted collision with the side of the host vehicle and outputting a detection value of the first physical quantity;
detecting, using at least one door sensor, a second physical quantity related to the predicted collision with the side of the vehicle and outputting a detection value of the second physical quantity;
instructing an airbag device to expand in response to a determination that the first physical quantity exceeds a first threshold or the second physical quantity exceeds a third threshold;
instructing the airbag device to expand in response to a determination that the predicted collision is in a cabin portion of the host vehicle and the second physical quantity exceeds the third threshold regardless of the first physical quantity; and
instructing the airbag device to expand in response to a determination that the collision prediction position is in a front fender of the host vehicle and the first physical quantity exceeds a second threshold regardless of the second physical quantity, the second threshold being smaller than the first threshold, wherein:
outputting the prediction result including a predicted relative speed of a collision prediction object and the host vehicle in a case where determination is made that the predicted collision is the inevitable collision; and
instructing the airbag device to expand in response to a determination that the output from the at least one door sensor exceeds a fourth threshold, and the predicted relative speed is equal to or higher than a predetermined speed determined in advance, wherein the fourth threshold is less than the third threshold.

6. An occupant protection device for a vehicle, the occupant protection device comprising:
a side collision prediction device configured to predict a collision with a side of the vehicle and output a prediction result including determination about whether the collision is an inevitable collision and a collision prediction position in response to a determination that the collision is the inevitable collision;
a first physical quantity detection device configured to detect a first physical quantity related to the collision with the side of the vehicle and output a detection value of the first physical quantity;
a second physical quantity detection device configured to detect a second physical quantity related to the collision with the side of the vehicle and output a detection value of the second physical quantity;

an airbag configured to expand to protect an occupant of the vehicle when the airbag is operated; and an electronic control unit configured to:
- instruct the airbag to expand in response to a determination that the first physical quantity exceeds a first threshold or the second physical quantity exceeds a third threshold,
- instruct the airbag to expand in response to a determination that the collision prediction position is in a cabin portion of the vehicle and the second physical quantity exceeds the third threshold regardless of the first physical quantity, and
- instruct the airbag to expand in response to a determination that the collision prediction position is a front fender of the vehicle and the first physical quantity exceeds a second threshold regardless of the second physical quantity, wherein the second threshold is less than the first threshold, wherein:
  - the side collision prediction device is configured to output the prediction result including a predicted relative speed of a collision prediction object and the vehicle in a case where determination is made that the collision is the inevitable collision; and
  - the electronic control unit is configured to instruct the airbag to expand in response to a determination that the second physical quantity exceeds a fourth threshold, and the predicted relative speed is equal to or higher than a predetermined speed determined in advance, wherein the fourth threshold is less than the third threshold.

7. The occupant protection device according to claim 6, wherein the second physical quantity detection device comprises:
- a first door sensor in a first door of the vehicle;
- a first pillar sensor in a first pillar of the vehicle; and
- a second pillar sensor in a second pillar of the vehicle.

\* \* \* \* \*